(12) United States Patent
Han et al.

(10) Patent No.: US 7,986,383 B2
(45) Date of Patent: Jul. 26, 2011

(54) LIQUID CRYSTAL DISPLAY DEVICE HAVING IMPROVED LIGHT GUIDE PLATE

(75) Inventors: Byung-Woong Han, Incheon (KR);
Dong-Cheol Kim, Suwon-si (KR);
Kyu-Seok Kim, Yongin-si (KR);
Jeong-Min Seo, Seongnam-si (KR);
Young-Bee Chu, Suwon-si (KR);
Sang-Min Yi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 11/931,928

(22) Filed: Oct. 31, 2007

(65) Prior Publication Data
US 2008/0129925 A1    Jun. 5, 2008

(30) Foreign Application Priority Data
Dec. 4, 2006    (KR) ........................ 10-2006-0121533

(51) Int. Cl.
*G02F 1/1335*    (2006.01)
(52) U.S. Cl. .......................................... 349/65; 349/61

(58) Field of Classification Search ............... 349/62–67
See application file for complete search history.

(56) References Cited

U.S. PATENT DOCUMENTS

| | | | |
|---|---|---|---|
| 6,976,779 B2 * | 12/2005 | Ohtsuki et al. | 362/608 |
| 7,056,005 B2 * | 6/2006 | Lee | 362/625 |
| 7,478,937 B2 * | 1/2009 | Hara et al. | 362/606 |
| 2005/0180166 A1 * | 8/2005 | Hara et al. | 362/606 |

FOREIGN PATENT DOCUMENTS

| | | |
|---|---|---|
| CN | 1553226 A | 12/2004 |
| CN | 2690915 | 4/2005 |
| JP | 2006-240275 | 4/2005 |
| KR | 10-0425511 | 3/2004 |
| KR | 10-0499140 | 6/2005 |
| WO | 2006/098479 | 9/2006 |

* cited by examiner

*Primary Examiner* — Kevin S Wood
(74) *Attorney, Agent, or Firm* — Innovation Counsel LLP (57) ABSTRACT

A backlight assembly for an LCD device having a light guide plate that includes at least two thin layers and a plurality of optical sheets sequentially stacked over the rear surface of the liquid crystal panel.

10 Claims, 8 Drawing Sheets

LIQUID CRYSTAL DISPLAY DEVICE HAVING IMPROVED LIGHT GUIDE PLATE

CROSS-REFERENCE TO RELATED APPLICATION(S)

This application claims priority from Korean Patent Application No. 2006-0121533 filed in the Korean Patent Office on Dec. 4, 2006, the entire content of which is incorporated by reference herein.

BACKGROUND OF THE INVENTION

1. Field of the Invention

The present invention relates to a liquid crystal display ("LCD") device and, in particular, to a backlight assembly having an improved light guide plate and a manufacturing method therefore.

2. Description of the Related Art

An LCD device has a structure in which liquid crystal cells are arranged between two transparent substrates in the form of a matrix, and a backlight assembly for providing light to the LCD panel.

A conventional backlight assembly includes a plurality of lamps, lamp housing for protecting the lamps, a light guide plate for guiding the light emitted from the lamps to the LCD panel, a reflection sheet arranged behind the light guide plate, and a plurality of optical sheets stacked on the light guide plate. Typically, the thickness of the backlight assembly occupies 50% to 95% of the total thickness of the LCD device of which the thickness of the light guide plate occupies 50% to 80%. Accordingly, the larger the thickness of the light guide plate becomes, the more difficult it is to manufacture a thin LCD device. Moreover, the dot and prism patterns for improving light efficiency formed on the rear surface of the light guide plate use a printing process that requires considerable manufacturing time, which results in a decrease in productivity.

SUMMARY OF THE INVENTION

The present invention, according to one aspect, provides a thin and lightweight LCD device having an easily manufactured light guide plate.

In accordance with an aspect of the present invention, a backlight assembly for a liquid crystal display device having a liquid crystal panel includes a light source for providing light to the liquid crystal display panel, a light guide plate including at least two thin layers for guiding the light from the light source to the liquid crystal display panel; and a plurality of optical sheets sequentially stacked over the rear surface of the liquid crystal panel, wherein the light guide plate includes a first thin layer formed of an optical film and a second thin layer stacked on the first thin layer and having a dot pattern.

The light guide plate includes a prism pattern formed in a shape selected a group consisting of a V shape, a saw tooth shape and a triangular shape on a light incident portion of the light guide plate facing the light source.

The prism pattern is formed with a length determined by the following formula:

$$PL > \frac{N-1}{N} * 100\%$$

wherein PL denotes the length of the prism pattern and N is the number of LED lamps.

The optical film comprises polycarbonate (PC), polyethylene terephthalate (PET), or the like.

The light guide plate is formed with a thickness in the range of about 20 μm to about 600 μm.

The dot pattern includes a plurality of dots whose diameters become larger as being distanced away from the light source. The dot pattern may include a plurality of dots whose diameters are in the range of about 20 μm to about 200 μm and where adjacent dots of the dot pattern are separated from each other by a distance in the range of about 100 μm to about 120 μm.

In accordance with another aspect of the present invention, there is provided a liquid crystal display including a liquid crystal display panel; a number of light sources providing light to the liquid crystal display panel; a light guide plate including at least two thin layers for guiding the light emitted by the light source to the liquid crystal display panel; a plurality of optical sheets sequentially stacked over the rear surface of the liquid crystal display panel; a bottom chassis accommodating the liquid crystal display panel, the light sources, the light guide plate, and the optical sheets; and a top chassis surrounding edges of the liquid crystal display panel and covering the lateral sides of the bottom chassis, wherein light guide plate includes a first thin layer formed of an optical film and a second thin layer stacked on the first thin layer and layer having a dot pattern.

The light guide plate includes a prism pattern having a shape selected from a group consisting of a V shape, a saw tooth shape, and a triangular shape formed on a light incident surface of the light guide plate facing the light sources.

The prism pattern may be formed having a length determined by the following formula:

$$PL > \frac{N-1}{N} * 100\%,$$

where PL denotes the length of the prism pattern and N is the number of LED lamps.

The prism pattern is formed facing the LED lamps and facing the area between the spaced apart LED lamps.

The optical film comprises polycarbonate (PC), polyethylene terephthalate (PET), or the like.

The second thin layer is formed of an ultraviolet-curing resin.

The light guide plate is formed with a thickness in the range of about 20 μm to about 600 μm.

The dot pattern includes a plurality of dots whose diameters become larger as being distanced away from the light sources. Moreover, the dot pattern includes a plurality of dots whose diameters are in the range of about 20 μm to about 200 μm and that are spaced apart from each other at a distance in the range of about 100 μm to about 120 μm.

In accordance with a further aspect of the present invention, a method of manufacturing a light guide plate for a liquid crystal display comprises: preparing a first thin layer wound around a first roller base; coating an ultraviolet-curing resin on the first thin layer; pressurizing or embossing the top of the ultraviolet-curing resin with a rotating mold having a groove and a protrusion; forming a second thin layer having a dot pattern in the area corresponding to the groove as the rotating mold comes in contact with the top of the ultraviolet-curing resin; curing the second thin layer having the dot pattern; and winding the light guide plate formed with the first and second thin layers around a second roller.

Preferably, the optical film comprises polycarbonate (PC), polyethylene terephthalate (PET), or the like.

Moreover, the dot pattern includes a plurality of dots whose diameters are in the range of about 20 μm to about 200 μm.

The dots are formed with a distance in the range of about 100 μm to about 120 μm.

Furthermore, the light guide plate has a thickness in the range of about 20 μm to about 600 μm.

In addition, the dot pattern includes a plurality of dots whose diameters become larger as being distanced away from the light sources.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Figure 1:
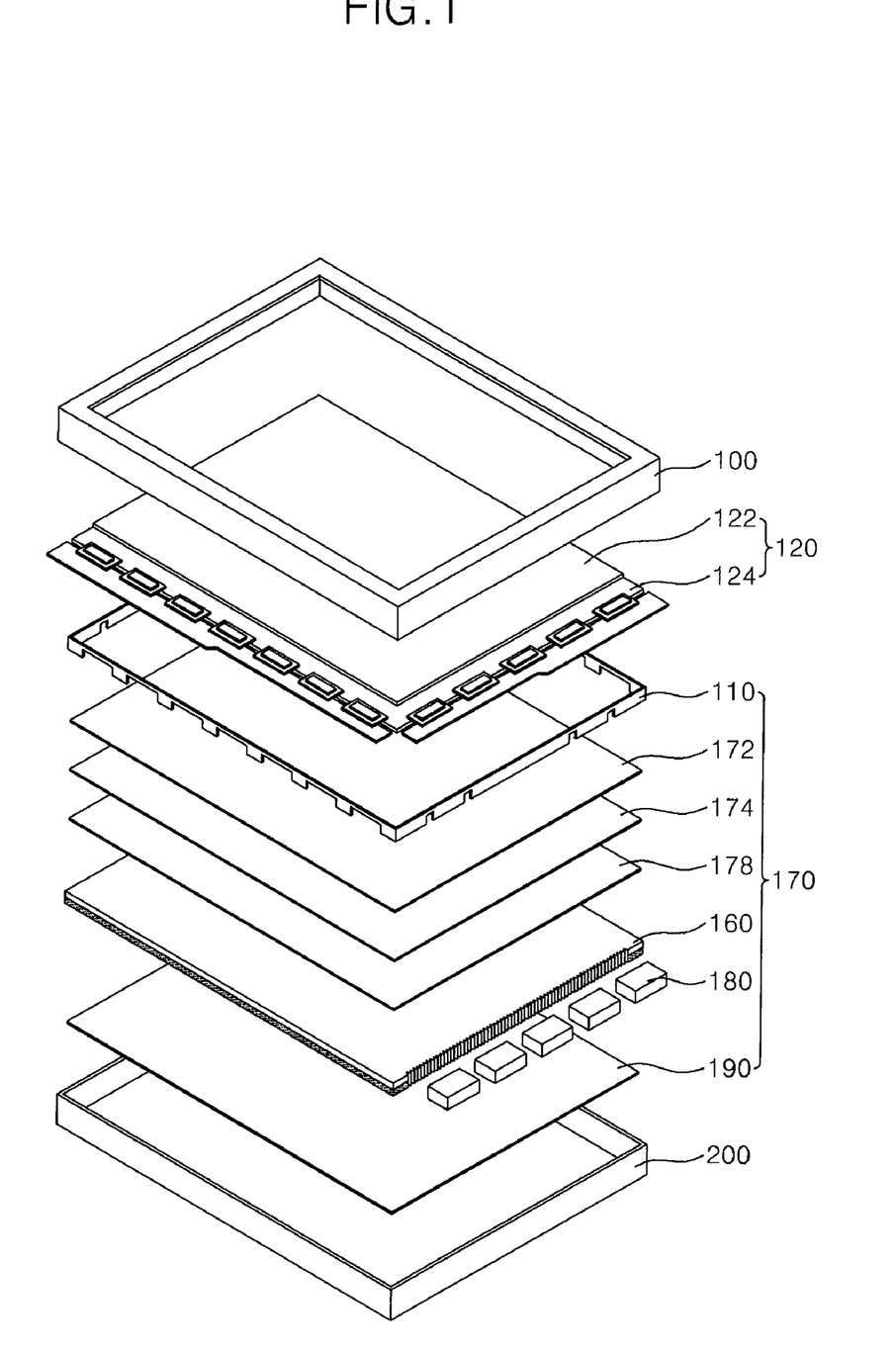
FIG. 1 is an exploded perspective view showing an LCD device according to an exemplary embodiment of the present invention.
Figure 2:
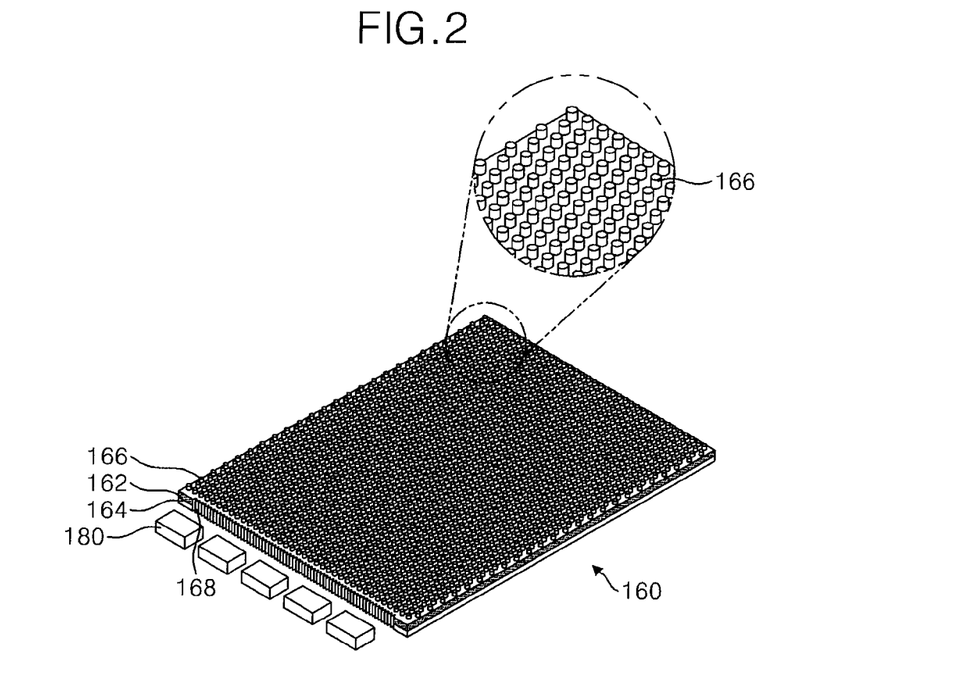
FIG. 2 is a perspective view showing a light guide plate according to an exemplary embodiment of the present invention.

FIG. 1 is an exploded perspective view showing an LCD device according to an exemplary embodiment of the present invention, and FIG. 2 is a perspective view showing a light guide plate according to an exemplary embodiment of the present invention.

Referring to FIG. 1, the LCD device includes an LCD panel 120 for displaying a picture in accordance with applied image signals, a backlight assembly 170 for providing light to the LCD panel 120, a mold frame 110 for accommodating the LCD panel 120 and the backlight assembly 170, a top chassis 100, and a bottom chassis 200.

The LCD panel 120 includes a thin film transistor ("TFT") substrate 124 and a color filter substrate 122 facing the TFT substrate 124. Liquid crystal is injected between the TFT substrate 124 and the color filter substrate 122 and thereby the LCD panel 120 displays a picture by adjusting the light transmissivity of the liquid crystal using TFTs arranged in the form of a matrix as switching elements. The color filter substrate 122 includes a color filter including red, green, and blue color filter segments corresponding to respective sub-pixel regions such that a picture can be displayed by the light passing through the color filter.

The top chassis 100 is configured to cover edges of the top surface of the LCD panel 120 and its up/down/left/right sides are to cover the lateral sides of the mold frame 110 and the bottom chassis 200.

The mold frame 110 accommodates the LCD panel 120 and the backlight assembly 170 to prevent the movements and to absorb an impact applied from the outside to the LCD panel 120 and the backlight assembly 170. Preferably, the mold frame 110 is made of a synthetic resin or plastic material for insulating the driving circuit.

The backlight assembly 170 including light emitting diode ("LED") lamps 180, a reflection sheet 190, a light guide plate 160, a diffusing sheet 178, a prism sheet 174, and a protecting sheet 172 provides light to the LCD panel 120.

The LED lamps 180 arranged at regular intervals provide light to the light guide plate 160. Such an LED lamp 180 is a PN junction semiconductor diode that emits photons when forward biased. The light-emission occurs when minority carriers recombine with carriers of the opposite type in the diode's band gap. The LED lamp 180 may be a typical LED, a high brightness LED, or the like. The typical LED emits light of uniform brightness without a voltage drop when current is applied, whereas, the high brightness LED emits light of high brightness and causes a voltage drop while emitting the light.

Two to three diffusing sheets 178 and prism sheets 174 may be appropriately combined with each other to diffuse or collect the light emitted from the light guide plate 160 and to improve brightness and viewing angle. The protection sheet 172 is provided on the diffusing sheet 178 or the prism sheet 174 to protect the sheets against and scratches and to prevent the sheets from being moved while transporting the backlight assembly 170.

The reflection sheet 190 reflects the light emitted to the bottom of the light guide plate 160 back to the light guide plate 160. For this purpose, the reflection sheet 190 is formed by coating a preform with a highly reflective material. The preform used may be aluminum (Al), polyethylene terephthalate (PET), etc. and the reflective material may be silver (Ag), titanium (Ti), etc.

The light guide plate 160 formed with at least two thin layers 162 and 164 diffuses the light emitted from the LED lamps 180 onto the whole surface of the light guide plate 160, uniformly. The thin layers 162 and 164 will be referred to as first and second thin layers, for the sake of convenience, but more layers may be used.

Figure 3:
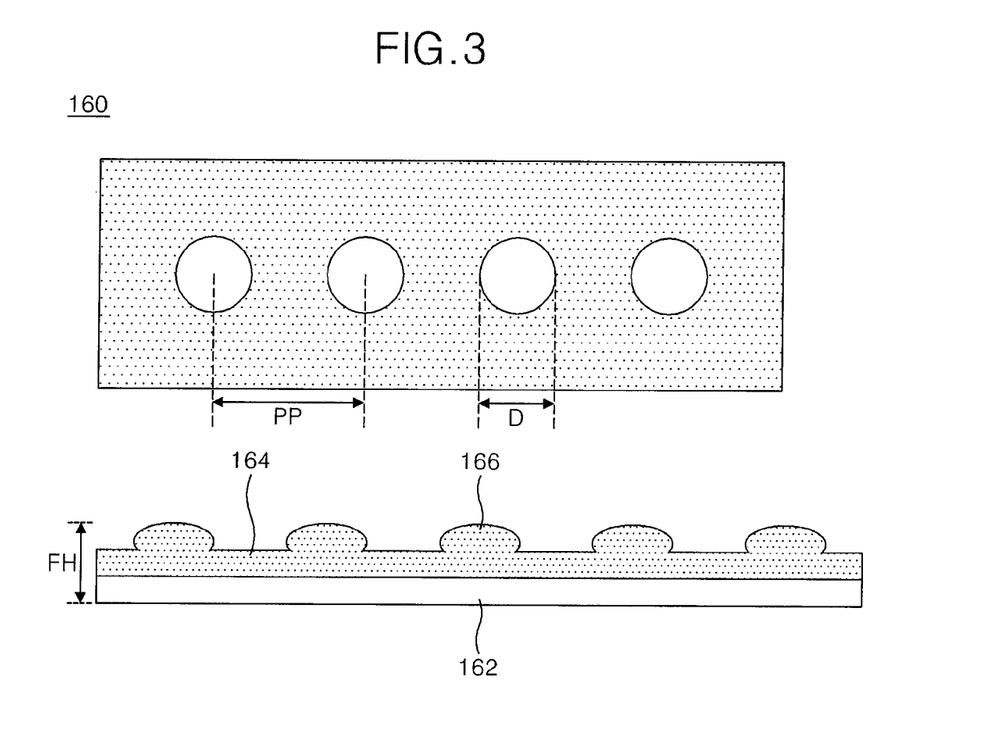
FIG. 3 is a top plan view and a cross-sectional view enlarging a portion of the light guide plate shown in FIG. 2.

Referring to FIG. 3, the first thin layer 162 is formed of an optical film, and the second thin layer 164 is stacked on the rear surface of the first thin film 162. The optical film comprises polycarbonate (PC), polyethylene terephthalate (PET), or the like. As the first thin layer 162 is formed with the optical film, the thickness of the light guide plate 160 can be reduced and it is thus possible to manufacture a thin light guide plate 160. As shown in the figure, it is possible to form the light guide plate 160 including the two thin layers 162 and 164 very thin, with a thickness FH in the range of about 20 μm to about 600 μm.

The second thin layer 164 includes a dot pattern having a plurality of dots in a polygonal, semi-oval, or semicircular shape so as to change the angle of light incident upon the LCD panel 120, and diffuse it, thus improving the brightness and viewing angle. The second thin layer 164 is made of an ultraviolet-curing resin using an imprinting process. Advantageously, the distance PP between the centers of adjacent circles of the dot pattern is about 100 to about 120 μm and the circles of the dot pattern 166 may each have a diameter D in the range of about 20 μm to about 200 μm.

Figure 4:
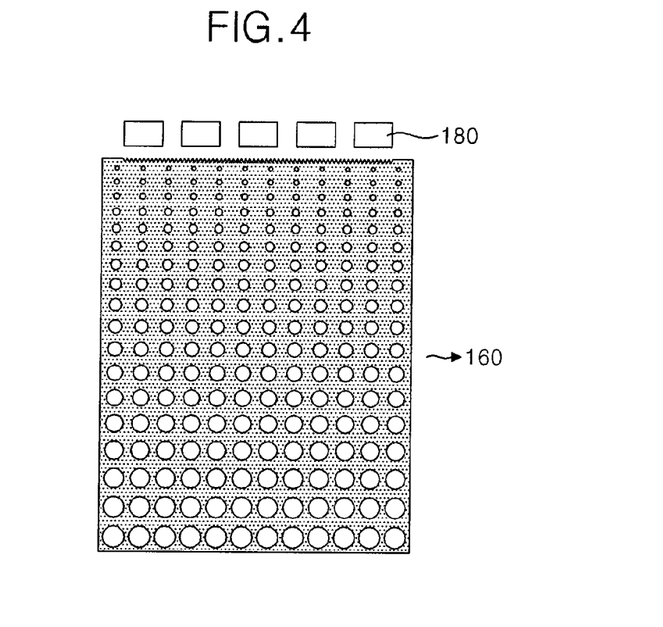
FIG. 4 is a top plan view showing a second thin layer of a light guide plate according to another exemplary embodiment of the present invention.

FIG. 4 is a top plan view showing a second thin layer 164 of a light guide plate 160 according to another embodiment of the present invention. As shown in the figure, the dot pattern may be formed such that the diameters of the circles on the second thin layer 164 become gradually larger from the area adjacent to the LED lamps 180 toward the opposite side thereby more uniformly diffusing the light over the area where no LED lamp present.

Figure 5:
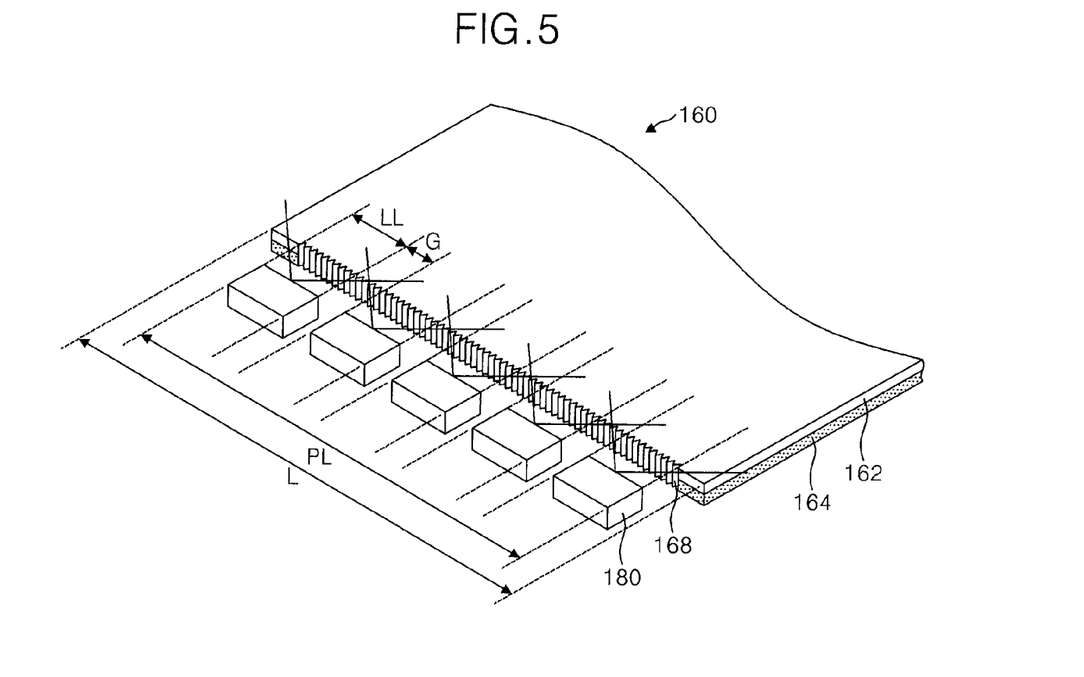
FIG. 5 is a partial perspective view of the light guide plate and LED lamps of FIG. 2 for illustrating a light incident portion of the light guide plate according to the present invention.

FIG. 5 is a partial perspective view of the light guide plate and LED lamps of FIG. 2 for illustrating a light incident portion of the light guide plate according to the present invention. As shown in the figure, the light incident portion L of the light guide plate 160 has a prism pattern 168 formed in a V shape, saw tooth, or triangular shape, so as to efficiently diffuse the light emitted from the LED lamps 180. The LED lamps 180 are arranged to be spaced apart from each other at regular intervals and to face the light incident portion L of the light guide plate 160. Moreover, the prism pattern 168 is formed at the area LL corresponding to the LED lamps 180 and as well as at the area corresponding to the gap G between the LED lamps 180 which may be spaced apart from each other. In other words, the length PL of the prism pattern 168 formed on the light incident portion L of the light guide plate 160 is determined by the following formula:

$$PL > \frac{N-1}{N} * 100\%$$

wherein N denotes the number of LED lamps.

For example, if the first to fifth LED lamps 180 are arranged facing the light incident portion L of the light guide plate 160, the length PL of the prism pattern 168 should be over 80% of the total length of the light incident portion L in accordance with formula 1. That is, the prism pattern 168 is formed from the area corresponding to the first LED lamp 180 to the area corresponding to the fifth LED lamp 180.

Figure 6:
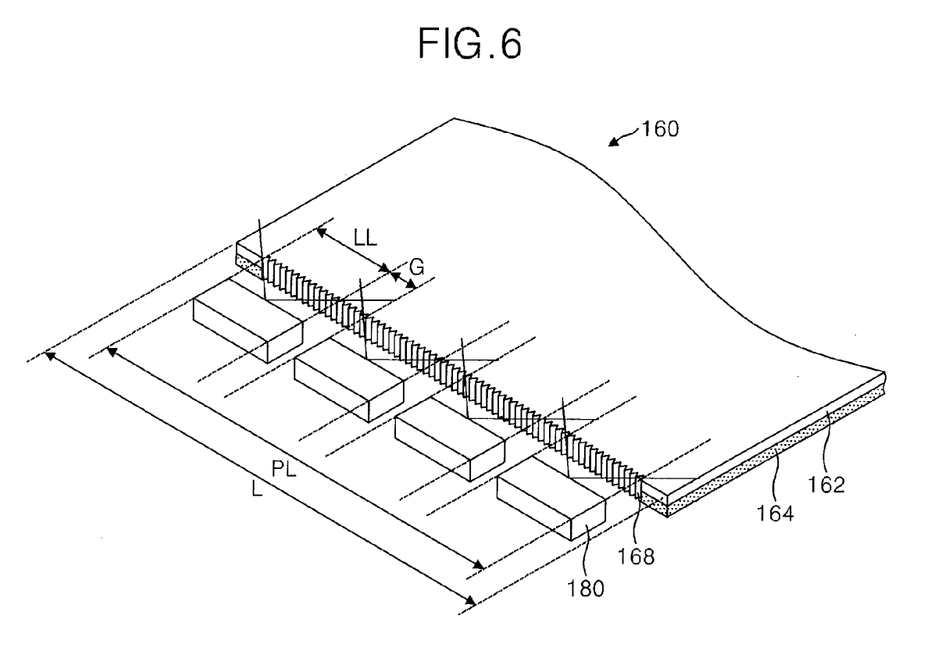
FIGS. 6 and 7 are partial perspective views illustrating light incident portions of light guide plates according to other exemplary embodiments of the present invention.
Figure 7:
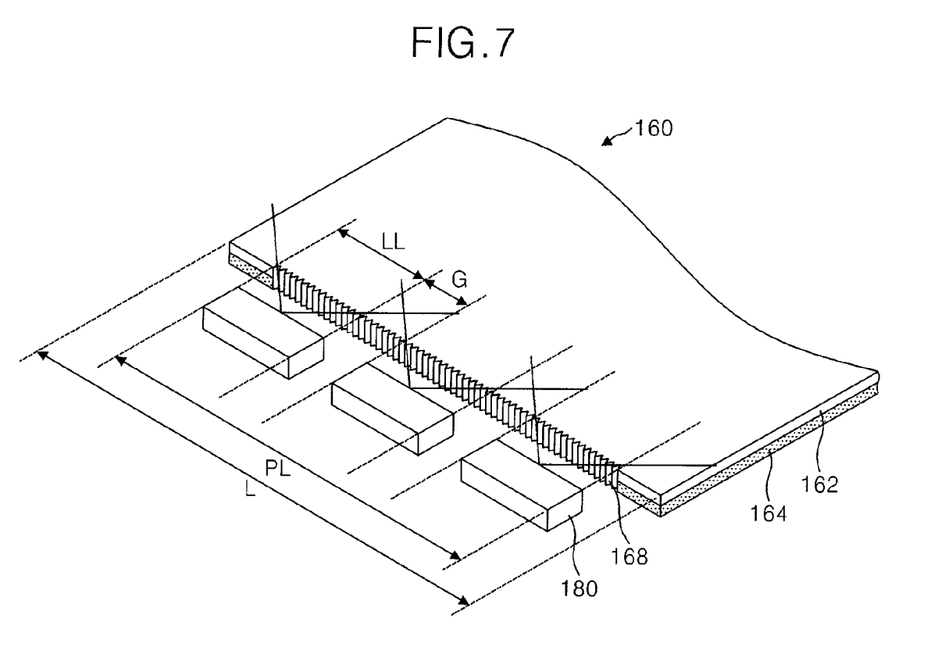

FIGS. 6 and 7 are partial perspective views illustrating light incident portions of light guide plates according to other embodiments of the present invention. As shown in FIG. 6, if the first to fourth LED lamps 180 are formed, the length PL of the prism pattern 168 should be over 75% of the total length of the light inlet part L in accordance with formula 1. Moreover, as shown in FIG. 7, if the first to third LED lamps 180 are formed, the length PL of the prism pattern 168 should be over 66% of the total length of the light inlet part L in accordance with formula 1. Accordingly, the formation process of the prism pattern 168 in accordance with the present invention can be simplified compared with the conventional prism pattern that should be formed at every area corresponding to the LED lamps.

Figure 8:
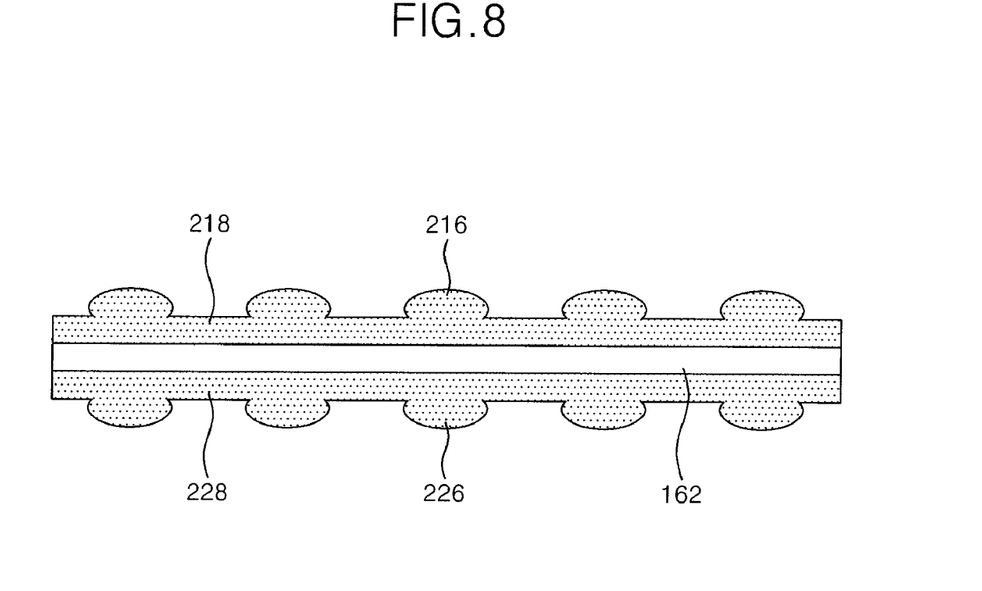
FIG. 8 is a cross sectional view showing a light guide plate according to another embodiment of the present invention.

FIG. 8 is a cross sectional view showing a light guide plate according to another embodiment of the present invention.

Referring to FIG. 8, the light guide plate 160 includes first to third thin layers 162, 218 and 228. The second thin layer 218 is formed on the front surface of the first thin layer 162, and the third thin layer 228 is arranged on the rear surface of the first thin layer 162. The first thin layer 162 is formed of an optical film. The second and third thin layers 218 and 228 include a dot pattern having a plurality of dots in a polygonal, semi-oval, or semicircular shape so as to change the light incident angle toward the LCD panel 120 and diffuse the light to improve brightness and viewing angle. Accordingly, detailed descriptions of the first to third thin layers 162, 218 and 228 having the same structure as that of the first embodiment of the present invention will be omitted.

Figure 9A:
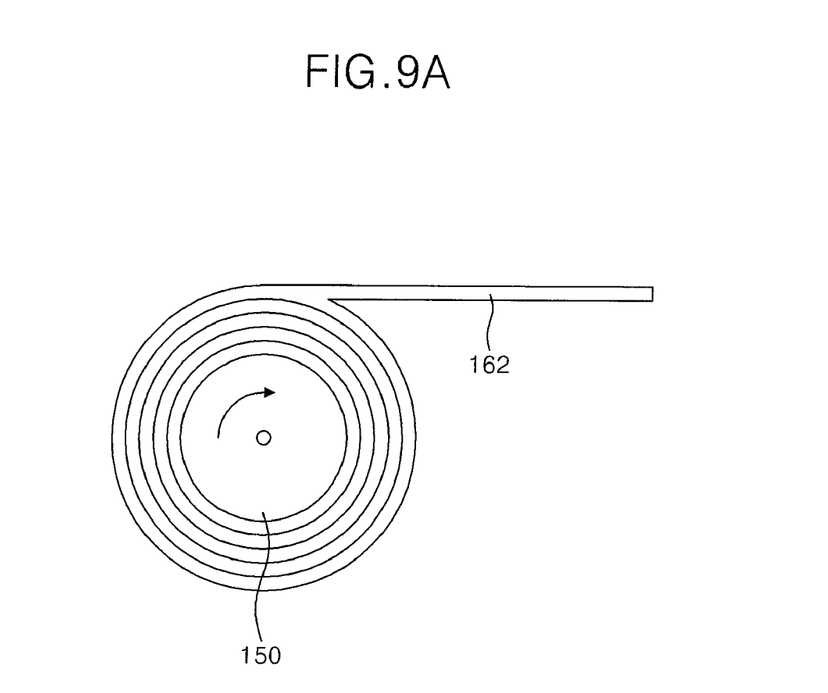
FIGS. 9A to 9C are cross sectional views illustrating a process for manufacturing the light guide plate shown in FIG. 2.
Figure 9B:
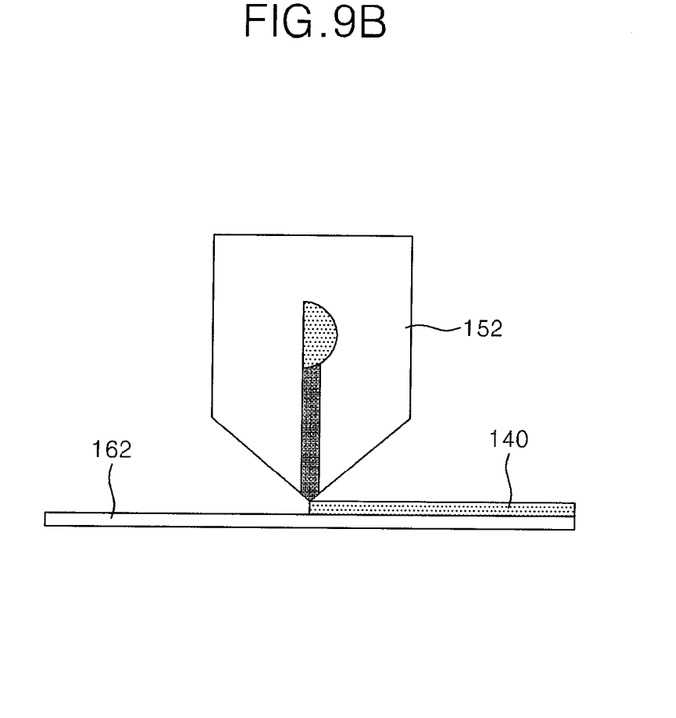
Figure 9C:
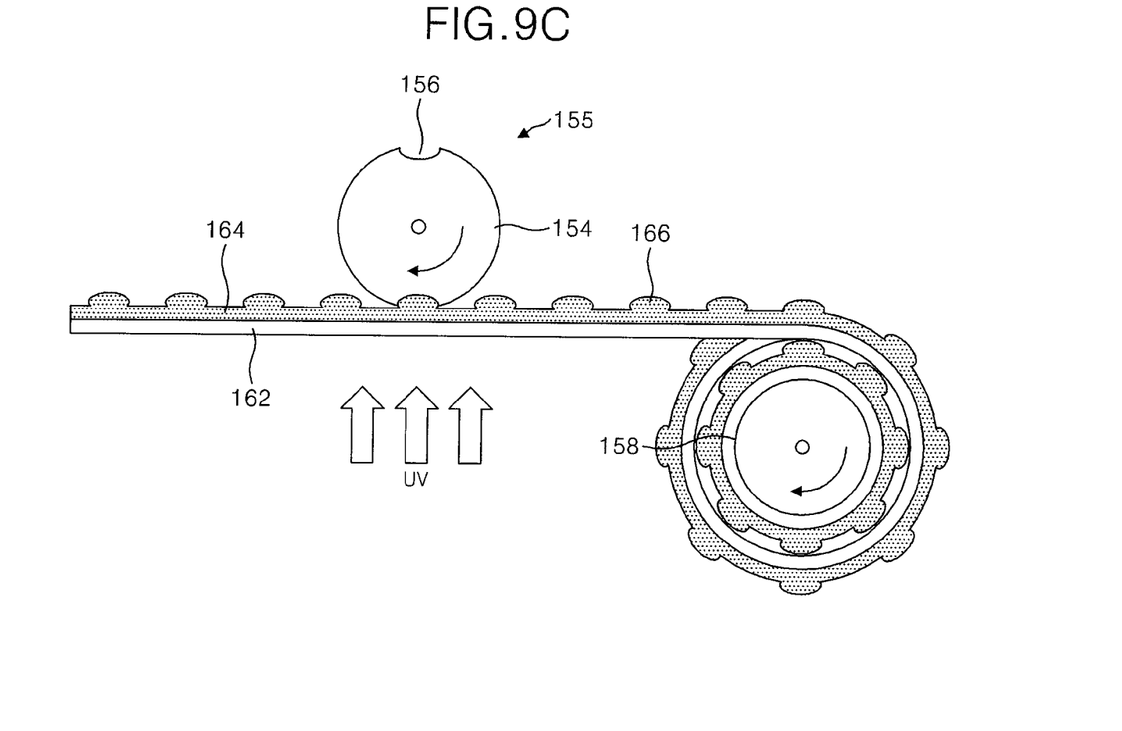

FIGS. 9A to 9C are cross sectional views illustrating a process for manufacturing the light guide plate according to the present invention.

As shown in FIG. 9A, a first thin layer 162 is wound around a first base roller 150. The first thin layer 162 is formed of an optical film comprising polycarbonate (PC), polyethylene terephthalate (PET), or the like. The first thin layer 162 is transferred to a resin coating apparatus. As shown in FIG. 9b, the resin coating apparatus 152 coats the surface of the first thin layer 162 with an ultraviolet-curing resin 140.

Subsequently, a rotating imprint mold 155 having a groove 156 and a protrusion 154 is arranged on the ultraviolet-curing resin 140 as shown in FIG. 9C. The rotating imprint mold 155 rotates in a predetermined direction to bring the surface of the protrusion 154 into contact with the ultraviolet-curing resin 140, thus embossing the ultraviolet-curing resin 140.

Accordingly, as a portion of the ultraviolet-curing resin 140 is moved into the groove 156 of the rotating imprint mold 155, a second thin layer 164 to which the dot pattern 166 is transferred by the groove 156 of the rotating imprint mold 155 is formed. The dots of the dot pattern 166 may be formed to have diameters in the range of 20 μm to 200 μm and with the distance between adjacent dots in the range of about 100 μm to about 120 μm. The second thin layer 164 formed on the first thin layer 162 is then cured by ultraviolet radiation. Next, the first and second thin layers 162 and 164 are wound sequentially around a second base roller 158.

Figure 10:
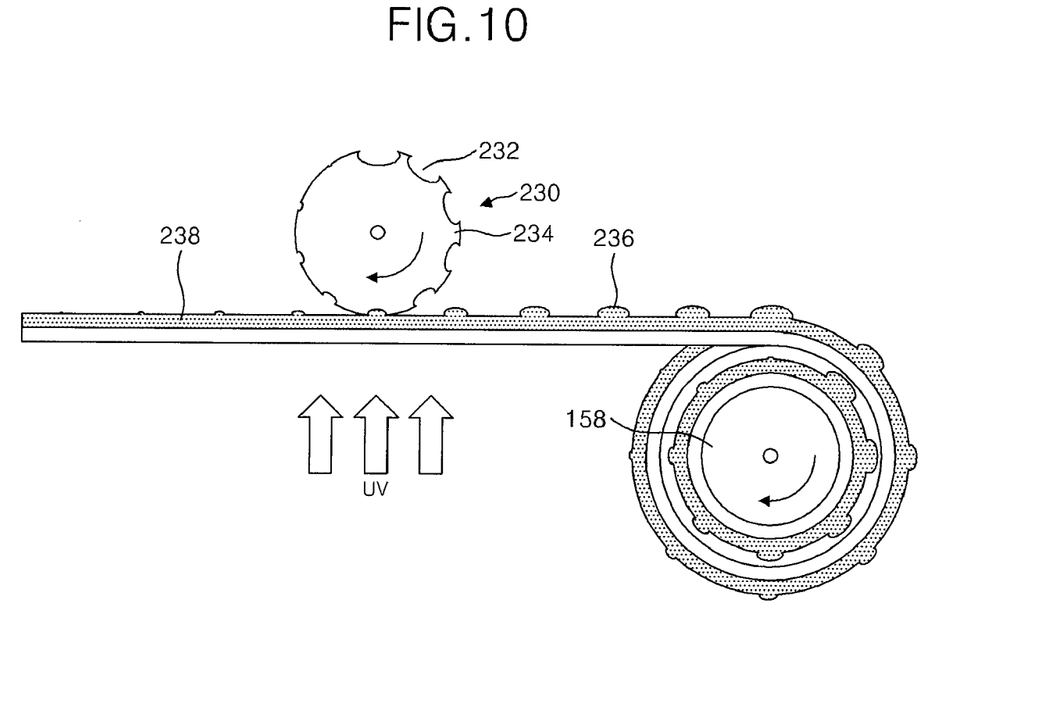
FIG. 10 is a cross sectional view illustrating a process for forming the second thin layer shown in FIG. 4.

FIG. 10 is a cross sectional view illustrating a process for forming a second thin layer according to another exemplary embodiment of the present invention. As shown in the figure, a rotating imprint mold 230 including a plurality of grooves 232 having different sizes is used to form the dot pattern 236 having a plurality of dots with a variety of diameters on the second thin layer 238. That is, the dots of the dot pattern 236 formed on the second thin layer 238 have diameters that become larger, gradually.

The dot pattern on the second thin layer 238 may be varied by modifying the imprint mold 230 to ensure an efficient manufacturing process.

Figure 11A:
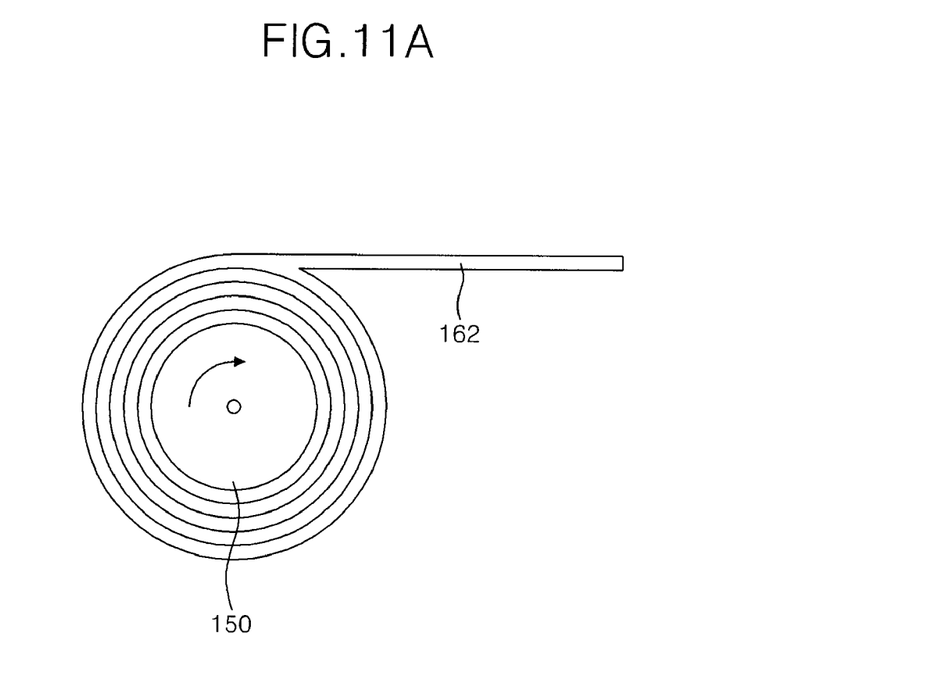
FIGS. 11A to 11C are cross sectional views illustrating a process for manufacturing the light guide plate shown in FIG. 8.
Figure 11B:
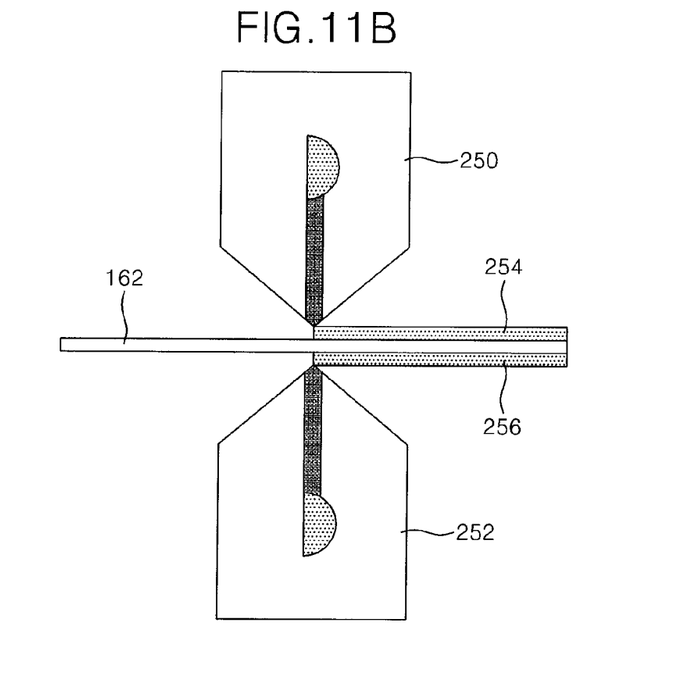
Figure 11C:
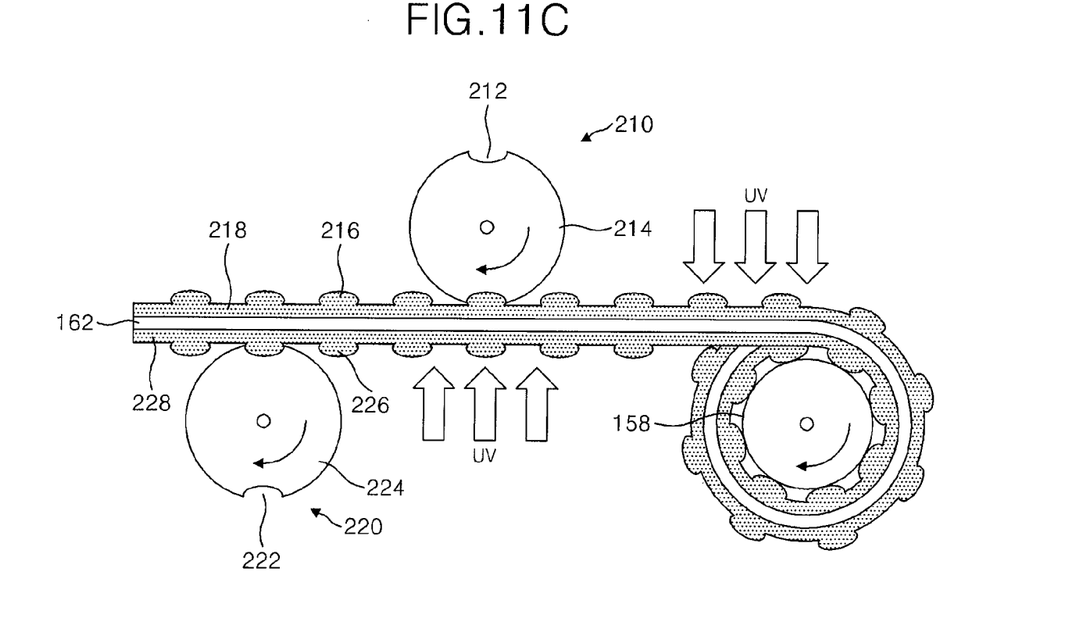

FIGS. 11A to 11C are cross sectional views illustrating a process for manufacturing a light guide plate according to a further exemplary embodiment of the present invention.

First, as shown in FIG. 11A, a first thin layer 162 is wound around a first base roller 150. The first thin layer is formed of an optical film comprising polycarbonate, polyethylene terephthalate (PET), or the like. The first thin layer 162 is transferred to first and second resin coating apparatuses 250 and 252 as shown in FIG. 11B. The first and second resin coating apparatuses 250 and 252 coat the front and rear surfaces of the first thin layer 162 with first and second ultraviolet-curing resins 254 and 256.

Subsequently, a first rotating imprint mold 210 having a groove 212 and a protrusion 214 is arranged on the top of the first ultraviolet-curing resin 254, and a second rotating imprint mold 220 having a groove 222 and a protrusion 224 is arranged on the top of the second ultraviolet-curing resin 256 as shown in FIG. 11C. Such first and second rotating imprint molds 210 and 220 rotate in a predetermined direction to bring the surfaces of the protrusions 214 and 224 of the first and second rotating imprint molds 210 and 220 into contact with the first and second ultraviolet-curing resins 254 and 256, thus embossing the first and second ultraviolet-curing resin 254 and 256. Accordingly, as portions of the first and second ultraviolet-curing resin 254 and 256 are moved into the grooves 212 and 222 of the rotating imprint molds 210 and 220, the second and third thin layer 218 and 228 are formed with dot patterns 216 and 226 transferred by the grooves 212 and 222. Here, it is possible to form the dot pattern 166 with a diameter in the range of 20 µm to 200 µm and with the distance between the dots adjacent to each other in the range of about 100 µm to about 120 µm. The second and third thin layer 218 and 228 formed on the first thin layer 162 are then cured by ultraviolet radiation. Next, the second and third thin layers 218 and 228 formed on the front and rear surfaces of the first thin layer 162 are wound around the second base roller 158.

As described above in detail, the light guide plate is formed having a first thin layer formed of an optical film and a second thin layer having a dot pattern formed on the rear surface of the first thin layer using an imprint mold. With the use of the optical film as the first thin layer, it is possible to reduce the total thickness of the light guide plate, and thereby to manufacture the LCD device in a thin and lightweight design. Moreover, the manufacturing method of the light guide plate in accordance with the present invention can simplify the manufacturing process, reduce the manufacturing time and thereby improve the productivity by conveying the light guide plate using a roll-to-roll process and by forming the dot pattern on the second thin layer using a rotating imprint mold.

Furthermore, the present invention can improve the light efficiency of the LCD device by forming the prism pattern in a V shape all over the light incident portion of the light guide plate, not limited to the areas facing the light sources.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A backlight assembly for a liquid crystal display having a liquid crystal panel, comprising:
    a light source for providing light to the liquid crystal display panel;
    a light guide plate including at least two thin layers for guiding the light from the light source to the liquid crystal display panel; and
    a plurality of optical sheets sequentially stacked over the rear surface of the liquid crystal panel,
    wherein the light guide plate includes a first thin layer formed of an optical film and a second thin layer stacked on the first thin layer and having a dot pattern, the dot pattern includes a plurality of dots whose diameters become larger as being distanced away from the light source, and
    the light guide includes a prism pattern having a shape selected from a group consisting of a V shape, a saw tooth shape, and a triangular shape on a light incident portion of the light guide plate facing the light source.

2. The backlight assembly of claim 1, wherein the prism pattern is formed with a length determined by the following formula, and the prism pattern is formed at the area facing the LED lamps and at the area facing the gap between the spaced-apart LED lamps:

$$PL > \frac{N-1}{N} * 100\%,$$

wherein PL denotes the length of the prism pattern and N is the number of LED lamps.

3. The backlight assembly of claim 2, wherein the optical film comprises polycarbonate (PC), polyethylene terephthalate (PET).

4. The backlight assembly of claim 2, wherein the light guide plate is formed with a thickness in the range of about 20 µm to about 600 µm.

5. The backlight assembly of claim 1, wherein the dot pattern includes a plurality of dots whose diameters are in the range of about 20 µm to about 200 µm,
    wherein the distance between adjacent dots of the dot pattern is in the range of about 100 µm to about 120 µm.

6. A liquid crystal display comprising:
    a liquid crystal display panel;
    one or more light sources providing light to the liquid crystal display panel;
    a light guide plate including at least two thin layers and guiding the light emitted by the light source to the liquid crystal display panel;
    a plurality of optical sheets sequentially stacked on the rear surface of the liquid crystal display panel;
    a bottom chassis accommodating the liquid crystal display panel, the light sources, the light guide plate, and the optical sheets; and
    a top chassis surrounding edges of the liquid crystal display panel and covering the lateral sides of the bottom chassis,
    wherein the light guide plate includes a first thin layer formed of an optical film and a second thin layer stacked on the first thin layer and having a dot pattern, the dot pattern includes a plurality of dots whose diameters become larger as being distanced away from the light source, and
    the light guide includes a prism pattern having a shape selected from a group consisting of V shape, a saw tooth shape, and a triangular shape on a light incident portion of the light guide plate facing the light sources.

7. The liquid crystal display of claim 6, wherein the prism pattern is formed with a length determined by the following formula, and the prism pattern is formed in the area facing the LED lamps and in the area facing the gap between the LED lamps spaced apart from each other:

$$PL > \frac{N-1}{N} * 100\%,$$

wherein PL denotes the length of the prism pattern and N is the number of LED lamps.

8. The liquid crystal display of claim 6, wherein the second thin layer is formed of an ultraviolet-curing resin.

9. The liquid crystal display of claim 6, wherein the light guide plate has a thickness in the range of about 20 µm to about 600 µm.

10. The liquid crystal display of claim 6, wherein the dot pattern includes a plurality of dots whose diameters are in the range of about 20 µm to about 200 µm.

* * * * *